United States Patent
Maryashin et al.

(10) Patent No.: US 8,953,652 B2
(45) Date of Patent: Feb. 10, 2015

(54) METHOD AND APPARATUS FOR DIFFERENTIALLY CONTROLLING POPULATION INVERSION IN GAIN MEDIUM

(71) Applicants: Sergey Maryashin, Burbach (DE); Andrey Unt, Burbach (DE); Igor Samartsev, Westborough, MA (US); Vladimir Antonenko, Fryazino (RU)

(72) Inventors: Sergey Maryashin, Burbach (DE); Andrey Unt, Burbach (DE); Igor Samartsev, Westborough, MA (US); Vladimir Antonenko, Fryazino (RU)

(73) Assignee: IPG Photonics Corporation, Oxford, MA (US)

( * ) Notice: Subject to any disclaimer, the term of this patent is extended or adjusted under 35 U.S.C. 154(b) by 1 day.

(21) Appl. No.: 14/019,751

(22) Filed: Sep. 6, 2013

(65) Prior Publication Data

US 2014/0056320 A1 Feb. 27, 2014

(51) Int. Cl.
| | | |
|---|---|---|
| *H01S 3/10* | (2006.01) | |
| *H01S 3/11* | (2006.01) | |
| *H01S 3/131* | (2006.01) | |
| H01S 3/067 | (2006.01) | |
| H01S 3/094 | (2006.01) | |
| H01S 3/16 | (2006.01) | |

(52) U.S. Cl.
CPC .............. *H01S 3/11* (2013.01); *H01S 3/10015* (2013.01); *H01S 3/1312* (2013.01); *H01S 3/0675* (2013.01); *H01S 3/094003* (2013.01); *H01S 3/094076* (2013.01); *H01S 3/1608* (2013.01); *H01S 3/1618* (2013.01); *H01S 2301/02* (2013.01)

USPC .......................................................... 372/25

(58) Field of Classification Search
CPC ............................... H01S 3/11; H01S 3/10015
USPC ..................... 372/25, 32; 250/492.1; 359/334
See application file for complete search history.

(56) References Cited

U.S. PATENT DOCUMENTS

| | | | | |
|---|---|---|---|---|
| 5,245,690 | A | | 9/1993 | Aida et al. |
| 6,163,399 | A | * | 12/2000 | Berg .................... 359/337.13 |
| 2004/0036960 | A1 | * | 2/2004 | Ramachandran ........ 359/341.41 |

OTHER PUBLICATIONS

International Search Report, dated Aug. 15, 2013.

* cited by examiner

*Primary Examiner* — Tuan Nguyen
(74) *Attorney, Agent, or Firm* — Yuri Kateshov, Esq.; Timothy J. King, Esq.

(57) ABSTRACT

A method and apparatus are operative to control the desired level of population inversion in a gain medium having an amplified spontaneous emission (ASE) spectrum which is characterized by distinct short- and long-wavelength regions. The control is realized by the apparatus configured to determine a relationship between the regions of the ASE spectrum represented by respective frequencies which are filtered by respective frequency discriminators. The apparatus includes a controller operative to process the filtered frequencies by determining a relationship between amplitudes of the respective filtered frequencies which represents a measured level of population inversion. Upon mismatch between the measured level and desired level of the population inversion, a control signal is coupled into a pulse generator or pump or both. In response, the pulse generator may output a pulse, or/and the pump may be completely shut down to lower the level of the measured inversion.

19 Claims, 5 Drawing Sheets

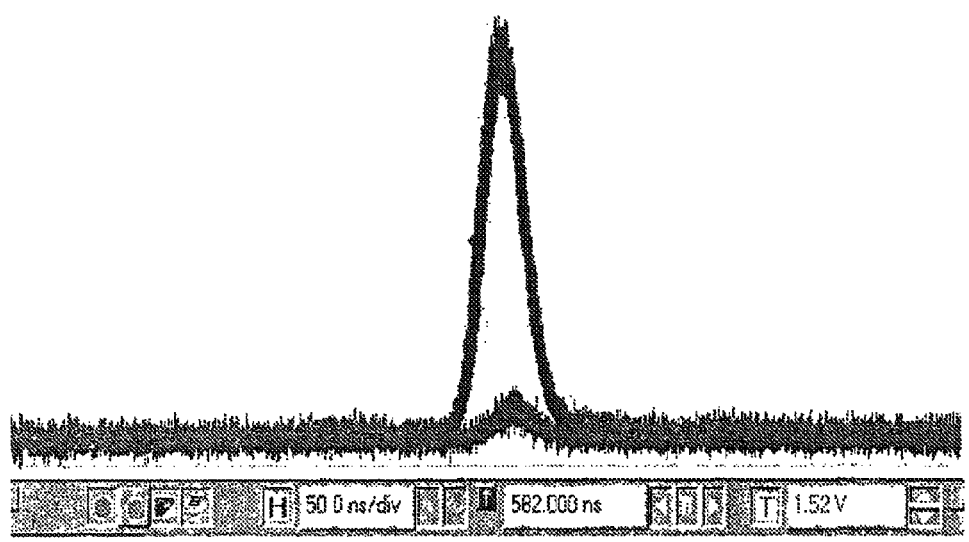
FIG. 1
FIG. 2
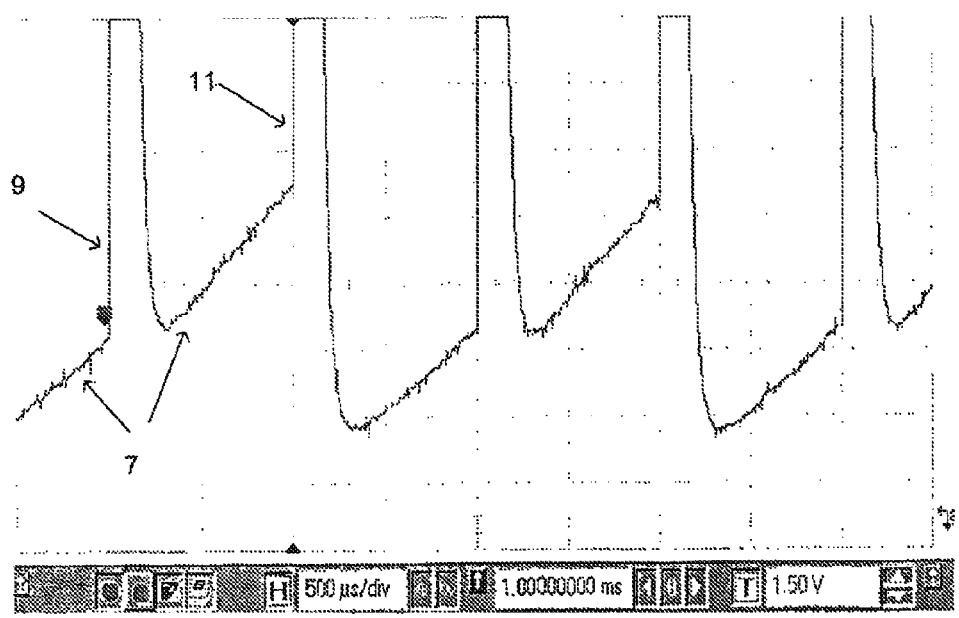

METHOD AND APPARATUS FOR DIFFERENTIALLY CONTROLLING POPULATION INVERSION IN GAIN MEDIUM

BACKGROUND OF THE DISCLOSURE

1. Field of the Disclosure

The disclosure relates to a process and apparatus for controlling the gain of laser components including lasers and optical amplifiers. More particularly, the disclosed process and apparatus allow determining the gain of the laser component by monitoring an amplified spontaneous emission (ASE).

2. Prior Art Discussion

FIG. 1 illustrates a typical oscillogram observed during the operation of pulsed lasers at frequencies of about and higher than 500 Hz. As can be seen, two pulses are observed at seemingly the same frequency, which in the illustrated example is about 1 kHz. The detailed analysis of this phenomenon shows that the pulses, in fact are sequential. The existence of sequential pulses may be explained by different gain coefficients before respective consecutive pulses. The non-uniformity of the gain coefficient may be caused by a high population inversion level remaining after a leading pulse.

FIG. 2 is an oscillogram illustrating luminescence 7, which is detected by a photo sensor, and providing the rational behind the pulse doubling phenomenon of FIG. 1. The luminescence level before odd pulses 9 is lower than that one before even pulses 11. Accordingly the population inversion affecting a gain coefficient alternates between lower and higher levels before respective odd and even pulses. Since the odd pulse has lower output energy, the population inversion level remains largely unaffected immediately thereafter as compared to the previously existing level. However, the population grows with a developing even pulse. As a consequence, the gain coefficient associated with even pulses is substantially higher than that one associated with odd pulses. After an even pulse, the population inversion level is substantially depleted and gain coefficient of following odd pulse is relatively low. This fluctuation of the gain coefficient has rather a periodic character and the level of the population thus may grow to prohibitively high levels. As known, high levels of the population inversion may cause undesirable pulsations in laser systems.

The gain is proportional to the optical power of amplified spontaneous emission (ASE). One of the known methods for determining ASE includes the use of optoelectronic sensors, which are operative to measure the integral value of the output optical power, and subsequent comparison of the measured power to a reference value. The method may introduce systematic errors in high power fiber laser systems caused by a variety of uncontrollable losses. One of such losses is represented by the deformation of splices between a signal fiber and a branch fiber carrying a portion of light propagating along an active fiber to the photo sensor due to elevated temperatures. The damaged splice may, in turn, lead to the unstable operation of laser systems and eventually may be the cause of their irreparable damage.

Another known method of measuring an ASE utilizes the pump coupled into an optoelectronic sensor. The method requires frequent calibrating of a power coefficient for the ASE-branched portion. The reliability and cost of such system may be problematic.

Accordingly, there is a need for process stabilizing a population inversion level and minimizing and, desirably, completely eliminating the pulse doubling effect in laser systems by determining the relationship between multiple signals which are selected from different frequency regions of the same ASE power density spectrum.

Still another need exists for a differential apparatus implementing the above-articulated method and operative to monitor the ASE level of the laser system.

SUMMARY OF THE DISCLOSURE

These needs are satisfied by the disclosed method and laser system. The principle of operation of the disclosed configurations includes determining relationship between power densities of an amplified spontaneous emission spectrum observed in the gain medium and corresponding to multiple spectral regions thereof. The spectral regions are determined as respective short- and long-wave regions having respective peaks. If the relationship is not satisfactory, a control signal is output and coupled into a pulse generator and/or pump. In response, the pulse generator emits an input light pulse reducing a level of population inversion which is stored in the gain medium. As a consequence, a controlled uniform gain associated with output light pulses is maintained. Alternatively or in addition to the pulse generation, the pump may be completely shut down to prevent a possible build-up of the population inversion.

In accordance one aspect, a fraction of ASE is branched through multiple guide branches of a connector. The guided portions of the ASE fraction are filtered by respective frequency discriminators so that the filtered frequencies represent the respective spectral regions of the ASE. The amplitude of respective frequencies are processed and either a ratio between the amplitudes or the difference therebetween on a dB scale is determined and further compared to a reference value representing the desired level of the population inversion. In case of mismatch, the control signal is coupled to drivers of respective optical components including the pulse generator and pump which are further operated to bring the measured level of the population down to the desired level.

In a further aspect, the branched fraction is differentiated as the population inversion grows between the pulses. The multiple maximal values of the differentiation, representing the respective short and long-wave regions of the ASE spectrum, are processed so as to determine the relationship therebetween. The result of the determination representing a measured level of the population inversion is compared to a reference value, and the control signal is output and coupled into optical components which are capable of altering the measured level population inversion level.

BRIEF DESCRIPTION OF THE DRAWINGS

The above and other aspects and advantages will become more readily apparent from the following description accompanied by the following drawings, in which:

FIG. 1 is an oscillogram illustrating a pulse doubling phenomenon.

FIG. 2 is an oscillogram illustrating the luminescence level detected by a photo sensor before odd and even pulses at a constant pump power and constant pulse frequency.

SPECIFIC DESCRIPTION

Reference will now be made in detail to the disclosed system. The drawings are in simplified form and are far from precise scale. The word "couple" and similar terms do not necessarily denote direct and immediate connections, but also include connections through intermediate elements or devices. The term gain medium means the source of optical gain and include, among others, crystals doped with rare-earth ions, silicate and phosphate glasses doped with rare-earth ions and fibers. The term laser system relates to all possible configurations of lasers and laser amplifiers.

The disclosed method in accordance with one aspect of the disclosure provides for determining two or more power densities of the ASE spectrum. The relationship between the measured values represents a measured level of population inversion, which is stored in a gain medium, and further compared to a reference value representing the desired level of the population inversion. Depending on the result of the comparison, a light signal pulse may be generated causing one or more optical components to operate so as to reduce the stored population inversion in the gain medium to the desired level. The substantial uniformity of the population inversion level minimizes detrimental influences of ASE power levels on the pulse stability, bending stresses and low frequency vibrations in the circuitry in the region of splices between fibers.

Figure 3:
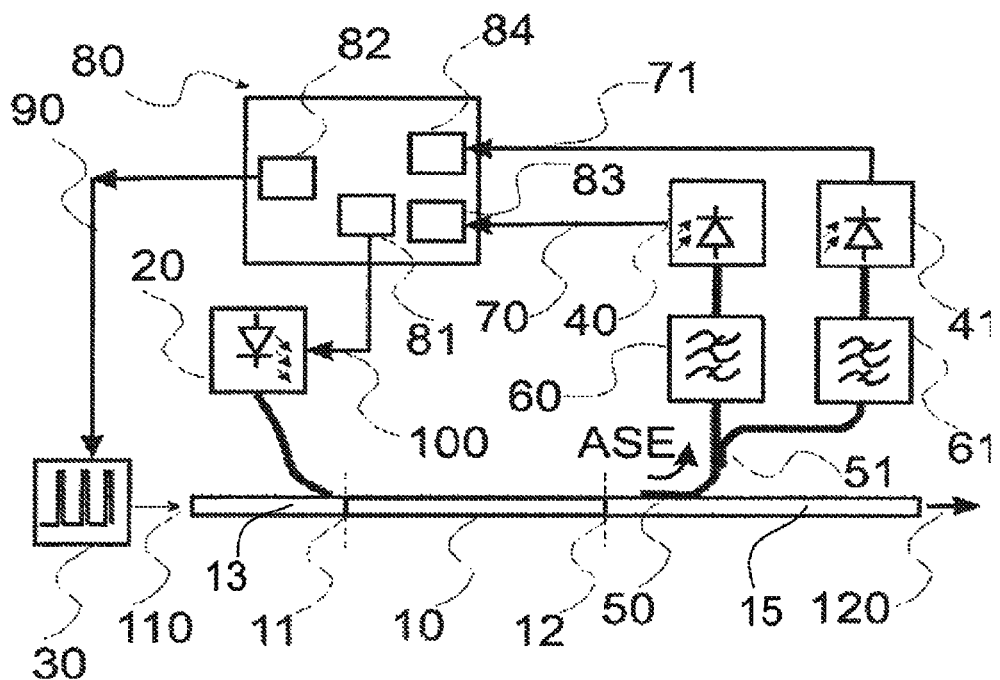
FIG. 3 is a diagrammatic optical circuitry of a pulsed fiber laser provided with two controllable spectral channels.
Figure 4:
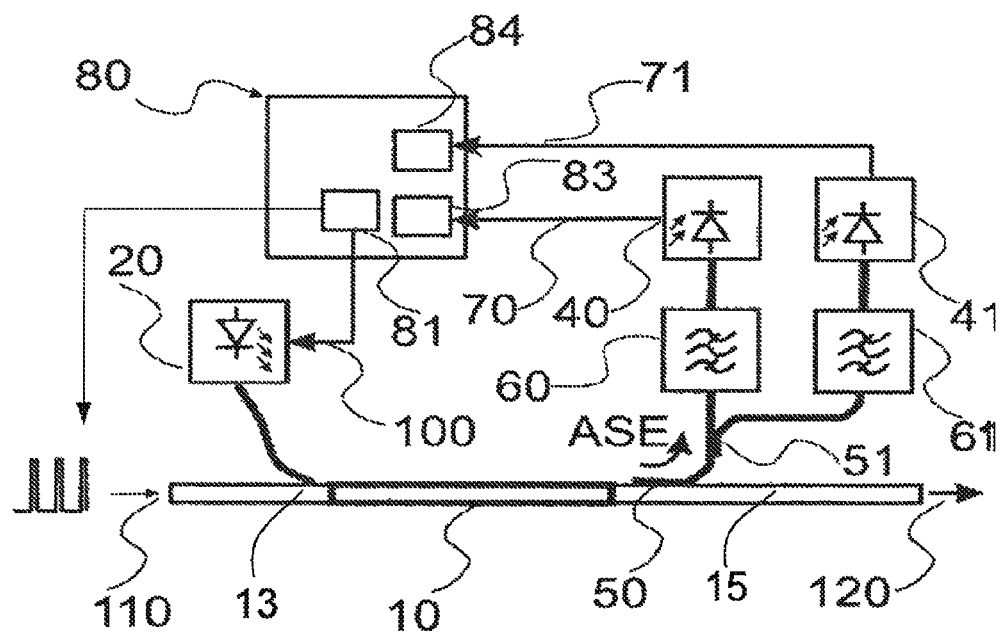
FIG. 4 is a diagrammatic optical circuitry of a poised fiber amplifier having two controllable spectral channels.

FIGS. 3 and 4 illustrate respective laser and optical amplifier configurations of a laser system implementing the first aspect of the disclosed method. The laser system is provided with a master oscillator 30 generating a light signal pulse which is coupled into a gain medium, and a pump 20 configured with one or more laser diodes which generate a pump light coupled into the gain medium.

The illustrated laser system is further referred to as a fiber system but can be of any suitable laser configuration. The fiber laser system is configured with one or more gain blocks each including an active fiber 10, which has its opposite ends spliced to respective input and output passive fibers 13, 15, and a housing enclosing these components (not shown). The active fiber 10 has a core doped with ions of one or more rare earth elements, such as Yb, Er and others as well as a combination of these. The difference between the illustrated oscillator and amplifier schematics includes fiber Bragg gratings 11 and 12, respectfully, defining a resonant cavity within the gain block of FIG. 3.

The pump light is absorbed by the core of fiber 10 and guided therealong towards block's output 120 while generating an amplified spontaneous emission (ASE). A fraction of ASE, such as 1%, is coupled into an input 50 of Y-shaped connector 51 which is in optical communication with fiber 10 and configured with multiple branch fibers guiding respective portions of the ASE fraction. The disclosed method does not require any particular coefficient of attenuation which considerably simplifies the disclosed structure. In case of high power laser systems with kW outputs, an additional 10-100 dB attenuator may be used. The branched light portions are simultaneously coupled to respective narrowband filters 60 and 61 which suppress all the ASE frequencies except for the desired ones.

The filters 60 and 61, respectively, each may be configured, for example, as a fiber Bragg grating (FBG) with the window of about 2 nm. The FBGs operate in respective different spectral regions of the ASE spectrum. One of the filters, for example, filter 60 is configured to transmit the desired frequency from a short-wavelength ASE region, whereas filter 61 transmits the desired frequency from a long-wavelength ASE spectrum region as explained immediately below in reference to FIG. 5.

Figure 5:
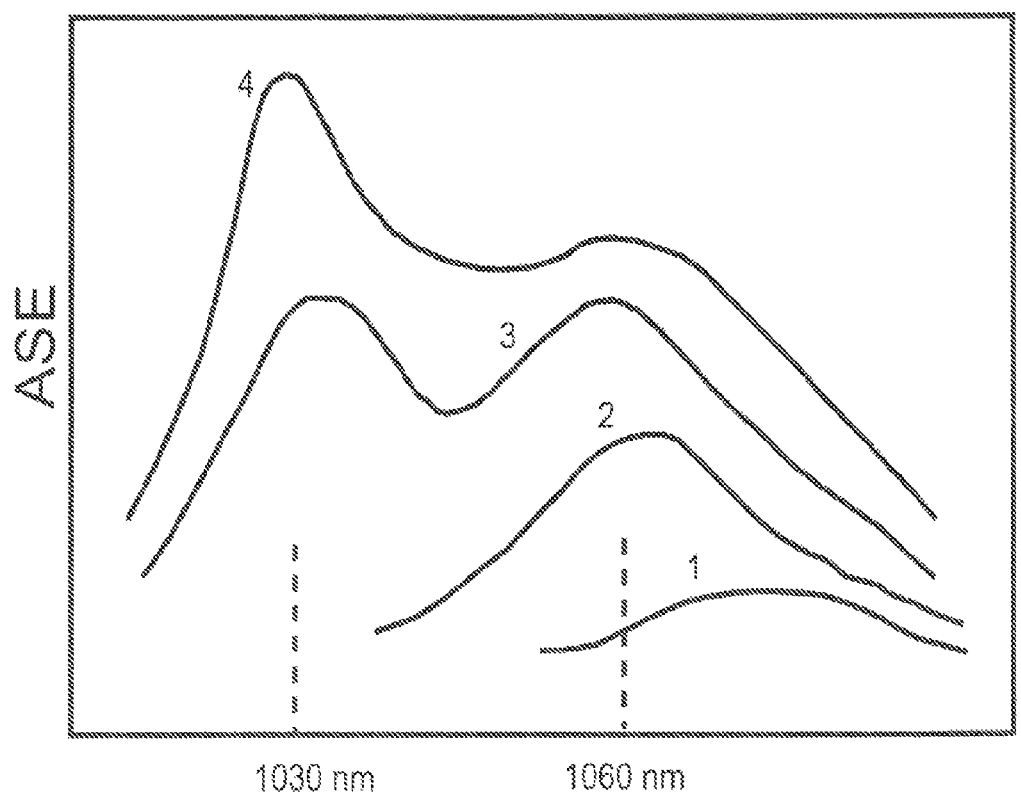
FIG. 5 is an ASE spectrum at four different levels of pump power.

FIG. 5 illustrates the power density ASE spectrum in an Yb-doped fiber at four 1, 2, 3 and 4 different levels of the pump power with curve 4 representing the highest pump current. As different as the spectra are, all four of them have one feature in common—two spaced power density peaks. One of the peaks is located at about 1030 nm wavelength and further referred to as the short-wavelength region ASE_H of the ASE spectrum, and the other at about 1060 nm wavelength further referred to as the long-wavelength region ASE_L of the ASE spectrum. The similar regions are observed for other rare-earth elements including, but not limited to, Erbium (Br) as discussed immediately below.

Figure 6:
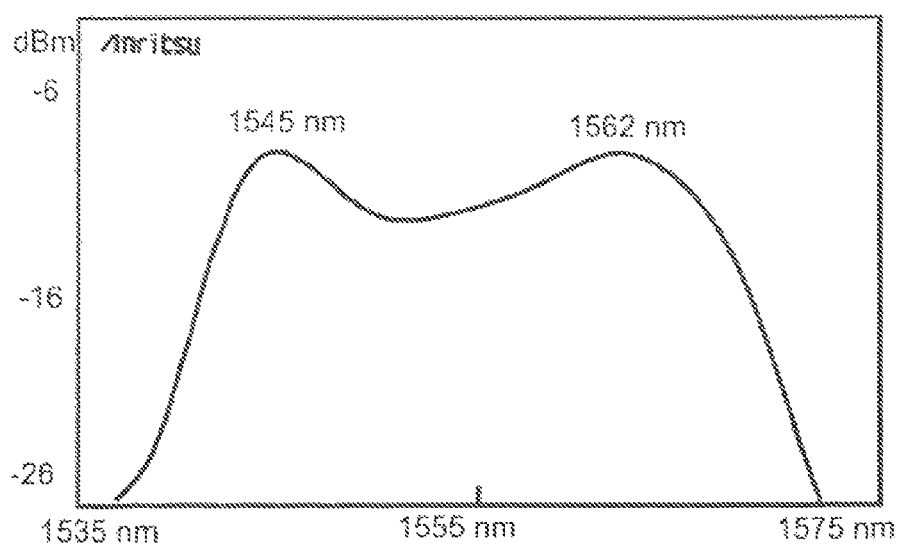
FIG. 6 illustrates and ASE spectrum in an Er doped fiber amplifier.

FIG. 6 illustrates the ASE spectrum for Er-doped fibers which are widely used in telecommunication. The ASE in Er-doped amplifiers, like the one in Yb-doped fibers, has two peaks: one ASE_H in a short wavelength region of the ASE spectrum at about 1545 nm and the other ASE_L in a long wavelength region around 1562 nm.

Figure 7:
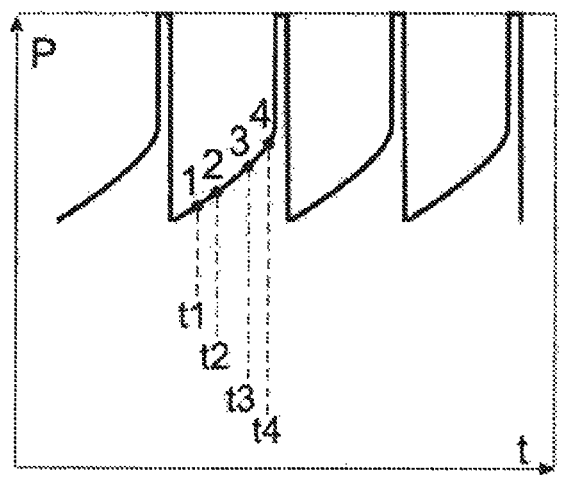
FIG. 7 illustrates the ASE output power between adjacent pulses.

FIG. 7 illustrates the technique utilized by disclosed devices and including measuring two or more spectral power densities of respective short- and long-wavelength regions of the ASE spectrum during a time period t1-t4 in which the inversion population grows between light signal pulses. The time here is a parameter so that at the same discrete time t1, t2, t3 or t4 (or others) the comparison can be made between synchronously measured powered densities of respective short and long wavelength regions of the ASE spectrum. Alternatively, the rate (the difference between measured amplitudes) at which the densities change during any time interval between discrete times within the selected time period, such as a t1-t2 interval or t3-t4 interval or any other interval, can be determined on a dB scale and compared to the reference value corresponding to the desired level of the population inversion.

Returning to FIGS. 3 and 4, the filtered frequencies are converted into respective electrical signals 70 and 71 by optoelectronic sensors 40 and 41 and received by controller 80 through respective analog-to-digital converters 83 and 84. Upon processing of the received signals, if necessary, control signals 81 and 90 are output through respective digital-to-analog converters 81 and 82, respectively. The control signal 90 is coupled into pulse generator 30 which, in response, emits a light pulse 110 coupled into the gain medium so as to reduce the determined high level of the population inversion. In addition or alternatively, pump 20 receiving the control signal 81 may be shut down so as to prevent any growth of the population inversion. The operation continues until the measured level of the population inversion substantially matches the desired level.

The criterion of the pump power sufficient to generate the desired safe level of the population inversion may be based on a certain ratio between maximum amplitudes of respective filtered frequencies from short and long-wave regions of the ASE spectrum, respectively. This relationship is selected for a given Yb-doped fiber since the energetic zonal structure may differ from one fiber to another depending on the manufacturing technology and types of other than rare-earth dopants.

In case of Er-doped fibers the desired criterion may correspond to a ASE_H/ASE_L ratio which is substantially equal to 1 and corresponds to a substantially uniform amplification of all WDM communication channels. If, for example, the ASE_H exceeds ASE_L at a certain value, such as 3 dB, the controller outputs a control signal shutting down the pump and a circuitry for preventing the amplifier's overload in the absence of WDM communication.

Figure 8:
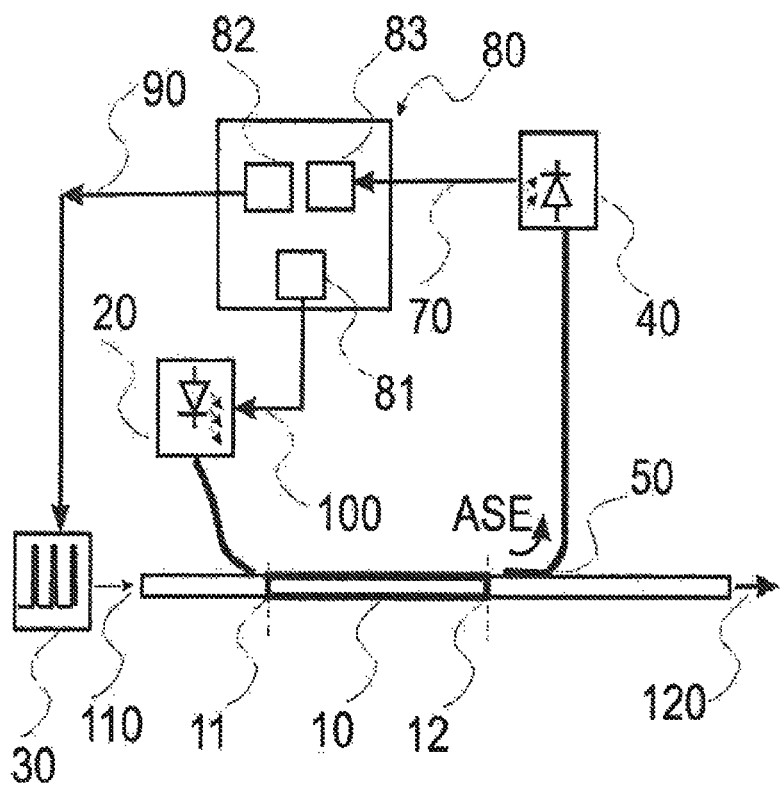
FIG. 8 is a diagrammatic optical configuration of pulsed laser.
Figure 9:
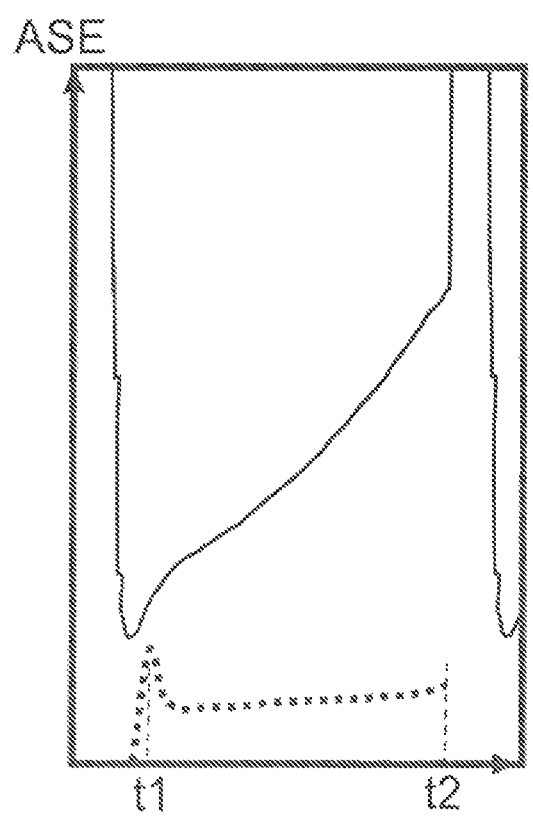
FIG. 9 illustrates an ASE power and its differential during time t between pulses generated by a fiber laser.

FIGS. 8 and 9 illustrate schematics implementing a further aspect of the disclosed method and apparatus. According to this aspect, the ASE can be determined by measuring a differential value thereof shown in FIG. 9 by phantom lines within a period of time during which the kinetics of the population inversion grows.

The method includes obtaining the ASE spectrum by branching a portion thereof through input 50 of connector 51. Thereafter, the integrated (full) ASE power of the branched portion is measured by photo sensor 40 during an interval t1-t2. As known, during the operation of pump 20, the ASE spectrum is initially t1 dominated by a long wavelength radiation. Subsequently, at time t2, a short wavelength radiation prevails. The sensor 40 converts the received ASE signals to respective electrical signals 70 coupled into controller 80 through analog to digital converter 83. The controller 80 is a medium, readable by at least one data processing device and embodying a code for causing the data processing device to perform certain operations. In particular, controller 80 has an operation of measuring differential values dASE(t1)/dt and dASE(t2)/dt, which correspond to respective long- and short-wavelength spectral regions, and determining the relations between the measured differential values. If the relationship does not correspond to a reference value, controller 80 outputs control signal 90 which is converted in digital to-analog converter 82 and further coupled into master oscillator 30. The latter generates a light signal pulse 110 that reduces the population inversion to the desired value provided the pump signal is fixed. Alternatively, control signal 100 processed in digital to analog converter 81 is received by the pump driver which may, if the light signal pulse rate is fixed, shut down pump 20 so as to prevent further growth of the inversion population that results in the desired output radiation 120. Still another alternative involves simultaneous generation of control signals 90 and 100 regulating oscillator 30 and pump 20, respectively.

The foregoing description and examples have been set forth merely to illustrate the disclosure and are not intended to be limiting. For example, the disclosed system and apparatus may very well operate so as to increase a level of population inversion. Accordingly, disclosure should be construed broadly to include all variation within the scope of the appended claims.

The invention claimed is:

1. A method for controlling a population inversion in an optical gain medium comprising:
   pumping the optical gain medium so as to generate amplified spontaneous emission (ASE) having a power density spectrum with short-wavelength and long-wavelength regions;
   determining a relationship between power densities of respective short-wavelength and long-wavelength regions by measuring a ratio between amplitudes of respective desired short and long wavelengths from respective short- and long-wavelength regions or a difference therebetween, thereby measuring a level of the population inversion;
   generating a control signal if the measured level does not substantially match a desired level, thereby coupling the control signal to an optical component configured to alter the measured level of the population inversion so as to substantially match the desired one.

2. The method of claim 1, wherein the coupling of the control signal into the optical component, winch is selected from the group consisting of a pulse generator and pump, and a combination thereof, includes a step selected from the group consisting of:
   generating a light pulse by the pulse generator, thereby depleting the measured population inversion, and
   lowering or completely shutting down an output of the pump, thereby preventing a growth of the measured population inversion, and
   simultaneously controlling the repetition rate of the pulse generator and the output of the pump so as to have the measured level of the population inversion match the desired level.

3. The method of claim of claim 2, wherein the determining of the relationship occurs between consecutive light pulses generated by the master oscillator.

4. The method of claim 1, wherein the determining of the relationship includes:
   branching a portion of the generated ASE among multiple branch fibers guiding respective sub-portions of the ASE;
   synchronously coupling the sub-portions into respective frequency discriminators operative to transmit the respective desired short and long wavelengths from; and
   coupling the transmitted desired short and long wavelengths into a controller so as to determine the relationship between the power densities of the respective coupled wavelengths.

5. The method of claim 4, wherein the determining of the relationship includes coupling the desired short and long wavelengths into respective optoelectronic sensors located downstream from respective frequency discriminators and operative to output respective electrical signals which correspond the respective power densities.

6. The method of claim 1, wherein the determining of the relationship includes:
   branching a portion of the generated ASE during an interval of time during which the ASE is growing;
   determining differential values of the power density of the branched portion at different times of the interval corresponding to the desired short- and long-wavelengths of the respective regions of the ASE spectrum;
   comparing a ratio between the determined differential values to a reference value representing the desired level of the population inversion.

7. The method of claim 6, wherein the determining of the relationship includes delivering the branched portion to an optoelectronic sensor.

8. The method of claim 1, wherein the gain medium doped with one or more rare-earth elements and generating the ASE with the power density spectrum which exhibits spectrally spaced peaks defining respective maximums of the short and long wavelength regions, respectively.

9. A laser system adapted to implement the method of claim 1, comprising:
   an optical component so as to create a population inversion level, the pump light generating amplified spontaneous emission (ASE) with a power density spectrum having short-wavelength and long-wavelength regions;

a data processing unit embodying a code for:

receiving and processing multiple signals representing respective power densities of selected frequencies from the short- and long-wavelength ASE regions, respectively, determining a relationship between the processed signals, the determined relationship corresponds to a level of the population inversion, and outputting a control signal, if the measured level exceeds a desired level, coupled into at least one of the master oscillator and pump operative to alter an operation thereof so as to lower the measured level of the population inversion to the desired one.

10. The laser system of claim 9, wherein the optical component assembly includes:

an optical pulse generator operative to radiate a series of light pulses amplified in the gain medium while reducing the measured population inversion level, and a pump radiating a pump light absorbed in the gain medium and creating the measured population inversion level which is determined between consecutive light pulses.

11. The laser system of claim 10 further comprising:

a connector having an input in optical communication with the gain medium and configured to receive and guide a fraction of the ASE, an optoelectronic sensor operative to process the fraction of the ASE and output the multiple signals corresponding to the respective power densities of the respective regions, a controller operative to determine the relationship between the multiple signals and compare the determined relationship to a reference value representing the desired level of the population inversion before generating the control signal coupled to the pulse generator or pump or to both pulse generator and pump.

12. The laser system of claim 11 further comprising a plurality of frequency discriminators operative to transmit the multiple signals corresponding to selected frequencies from respective short- and long-wavelength regions to the controller.

13. The laser system of claim 12, wherein the controller is provided with a program for determining a ratio between amplitudes of the respective multiple signals.

14. The laser system of claim 12, wherein the controller is provided with a program for determining a difference between amplitudes of the respective on a dB scale.

15. The laser system of claim 11 further comprising an optoelectronic sensor receiving the ASE fraction from the connector during a time interval between the consecutive light pulses, wherein the ASE fraction received during an initial stage of the interval and during a final stage of the interval represents the respective short-wavelength and long-wavelength regions.

16. The laser system of claim 15, wherein the optoelectronic sensor outputs the multiple signals to the controller provided with a program for determining differential values of respective signals.

17. The laser system of claim 9, wherein the gain medium is selected from the group consisting of glass, crystal and optical fiber and a combination of these.

18. The laser system of claim 9, wherein the laser component is selected from group consisting of an optical amplifier and laser and a combination of these.

19. The laser system of claim 9, wherein the gain medium is doped with ions of one or more rare-earth metals.

* * * * *